(12) United States Patent
Tomono et al.

(10) Patent No.: US 8,764,208 B2
(45) Date of Patent: Jul. 1, 2014

(54) METER ILLUMINATION DEVICE

(75) Inventors: Koichi Tomono, Niigata (JP); Satoshi Ishizuki, Niigata (JP)

(73) Assignee: Nippon Seiki Co., Ltd., Niigata (JP)

( * ) Notice: Subject to any disclaimer, the term of this patent is extended or adjusted under 35 U.S.C. 154(b) by 238 days.

(21) Appl. No.: 13/375,170

(22) PCT Filed: May 17, 2010

(86) PCT No.: PCT/JP2010/058257
§ 371 (c)(1),
(2), (4) Date: Nov. 29, 2011

(87) PCT Pub. No.: WO2010/137478
PCT Pub. Date: Dec. 2, 2010

(65) Prior Publication Data
US 2012/0075831 A1     Mar. 29, 2012

(30) Foreign Application Priority Data

May 29, 2009    (JP) ................................ 2009-129926

(51) Int. Cl.
*G01D 11/28*      (2006.01)
(52) U.S. Cl.
USPC .................................. 362/23.11; 362/23.12
(58) Field of Classification Search
USPC ............. 362/23.11, 23.12, 23.19, 26, 30, 489
See application file for complete search history.

(56) References Cited

U.S. PATENT DOCUMENTS

2004/0212976 A1* 10/2004 Mikami .......................... 362/23
2008/0141927 A1*  6/2008 Takeshige et al. .......... 116/62.4
2008/0310141 A1* 12/2008 Mezouari ....................... 362/30

FOREIGN PATENT DOCUMENTS

| JP | 11-101666 A | | 4/1999 |
| JP | 11-132794 A | | 5/1999 |
| JP | 2001-201372 A | | 7/2001 |
| JP | 2001201372 A | * | 7/2001 |
| JP | 2005-024418 A | | 1/2005 |

* cited by examiner

*Primary Examiner* — Joseph L Williams
(74) *Attorney, Agent, or Firm* — McDermott Will & Emery LLP

(57) ABSTRACT

Disclosed is a meter illumination device which makes it possible to sufficiently illuminate the indicating sections of the indicating needle and the display panel. A meter housing (8) is equipped with a light guide tube (81) that guides light rays from a light source (7) to the base (42) end of an indicating needle (4); a light guide opening (82) that is provided between the bottom end of the light guide tube (81) and a circuit board (1); an upright reflective circumferential wall section (83) that surrounds the periphery of the light guide opening (82) and is provided at a prescribed distance from the light source (7); a first reflective wall section (85) that is provided in order to perform transmission illumination of the indicating section (5) regions of a display panel (6), and that is contiguous with the upper end of the upright reflective circumferential wall section (83); and a second reflective wall section (86) having a substantially inverted conical shape provided at a point on the outer periphery of the light guide tube (81) for reflectively directing light onto the first reflective wall section (85).

6 Claims, 5 Drawing Sheets

METER ILLUMINATION DEVICE

RELATED APPLICATIONS

This application is the U.S. National Phase under 35 U.S.C. §371 of International Application No. PCT/JP2010/058257, filed on May 17, 2010, which in turn claims the benefit of Japanese Application No. 2009-129926, filed on May 29, 2009, the disclosures of which Applications are incorporated by reference herein.

TECHNICAL FIELD

The present invention relates to a meter illumination device configured to display an indicating needle and a display panel of an indicating meter by illumination.

BACKGROUND ART

As a meter illumination device of this type, there is a known type having a configuration in which a meter body having a drive shaft provided so as to project therefrom is mounted on a circuit board, an indicating needle which is lit upon receipt of illuminating light from the side of a center of rotation is mounted at a distal end of the drive shaft, a display panel (dial panel) having translucent markings such as calibration markings or characters along an orbit of rotation of the indicating needle is mounted on the back side of the indicating needle, and the markings and the indicating needles of the display panel are lit by a luminous source arranged on the back side of the display panel.

As the meter illumination device of this type, a light guide is disposed on the back side of a display panel, so that light from the luminous source is guided into the light guide and guided to an exit portion of the light guide, and then guided from the exit portion to a proximal portion of the indicating needle, which is a center of rotation of the indicating needle, thereby displaying an indicating portion of the indicating needle with light emission, or the markings of the display panel are lit therethrough via the light guide provided on the back side of the display panel. In such a meter device, since the meter body is arranged on the back side of the circuit board, the light guide formed into a flat panel shape can be arranged between the luminous source and the display panel, and hence a substantially uniform and bright illuminating effect is obtained while reducing the thickness of the lighting device structure as a whole.

However, since the light guide is required, there is a problem in that the cost of the components and the weight of the entire device are increased, and the illuminating structure becomes complicated.

Accordingly, in Patent Document 1, for example, a configuration in which light reflected by irradiating a reflecting surface with radiated light beams from luminous sources arranged so as to surround the rotational center of an indicating needle via a reflecting wall which constitutes part of a meter case is caused to illuminate markings provided on a display panel, or light is guided toward a proximal portion of the indicating needle by a tubular portion provided integrally with a meter case to light up an indicating portion of the indicating needle without using a light guide or the like is known.

Therefore, by providing a reflecting wall or a reflecting surface on the meter case, an illumination device of the meter case can advantageously be made up of relatively simple constituent means without adding components such as individual light guides, which is effective for cost reduction.

CITED REFERENCE

Patent Document

Patent Document 1: JP-A-2001-201372

SUMMARY OF INVENTION

Problems to be Solved by the Invention

In Patent Document 1 described above, there is a cost advantage because the light guide is not used and there is an effect such that the indicating needle and the markings of the display panel can be displayed simultaneously by lighting therethrough with light beams radiated from the luminous sources arranged so as to surround the rotational center of the indicating needle. However, since lighting of the markings is achieved by the light beams radiated from the luminous sources and reflected and guided many times between the reflecting wall or the reflecting surface which constitutes part of the meter case and the display panel, sufficient brightness cannot be obtained when the light from the luminous source lights the markings of the display panel therethrough. There may also arises a problem of unbalanced illumination on the indicating needle such that partially bright portions and partially dark portions exist depending on the position of installation of the luminous sources.

In view of such problems described above, it is an object of the present invention to provide a meter illumination device which is capable of displaying an indicating needle and markings of a display panel by illumination with sufficient brightness even with a relatively small number of luminous sources.

Means for Solving the Problems

In order to solve the above described object, the present invention provides a meter illumination device including; a circuit board formed of a hard material; a meter body arranged on the back side of the circuit board and having a drive shaft extending forward; a light-emitting type indicating needle to be mounted on a distal end side of the drive shaft; a display panel arranged between the indicating needle and the circuit board and having at least a marking corresponding to the indicating needle; a luminous source arranged on the side of a front surface of the circuit board and configured to light up the indicating needle and the markings; and a meter housing arranged between the display panel and the circuit board and provided for setting a distance between the display panel and the circuit board, the meter housing includes: a substantially cylindrical light guide tubular portion positioned on the back side of the display panel and configured to guide a radiated light beam from the luminous source toward a proximal portion of the light-emitting indicating needle, a light guide opening provided between a lower end portion of the light guide tubular portion and the circuit board, a rising reflecting peripheral wall portion positioned on the side of the front surface of the circuit board, provided so as to surround the periphery of the light guide opening at a predetermined distance from the luminous source and extend upward to a level above a light-emitting surface of the luminous source, a first reflecting wall portion provided continuously from an upper end portion of the rising reflecting peripheral wall portion to light up through an area of the marking of the display panel, and a second reflecting wall portion having a substantially inverted conical shape provided at a position on the outer periphery of the light guide tubular portion so as to reflect and guide the light from the luminous source to the first reflecting wall portion.

In this configuration, the indicating needle can be caused to emit light and lit up by the luminous source provided around a shaft portion (drive shaft) of the indicating needle and lighting up of the area of the markings of the display panel can also be achieved. In addition, since part of the light from the luminous source can be reflected and guided by the rising reflecting peripheral wall portion and can be reflected and guided toward the proximal portion of the indicating needle by the inner side of the light guide tubular portion, the amount of light can be compensated, whereby sufficient illumination brightness of the indicating needle can be maintained. Also, the area of the markings of the display panel can reflect and guide the light beams from the first and second reflecting wall portion luminous sources and, specifically, can be directly guided toward the first reflecting wall portion by the second reflecting wall portion, so that the markings of the display panel can be displayed brightly by illumination.

Also, the meter housing may be provided with an optical path guiding and reflecting wall portion that connects the rising reflecting wall portion and the first reflecting wall portion.

In this configuration, the area of the marking of the display panel can reflect and guide the light beams from the luminous sources by the first and second reflecting wall portions and the optical path guiding and reflecting wall portion and, specifically, a light beam coming from a long distance and reflected from the second reflecting wall portion can be directly guided toward the first reflecting wall portion via the optical path guiding and reflecting wall portion, so that the marking of the display panel can be displayed brightly by illumination.

Also, the meter housing may be provided with a peripheral wall portion so as to set the distance between the display panel and the circuit board along a peripheral edge portion of the circuit board.

In this configuration, by providing the peripheral wall portion around the meter housing so as to cover the peripheral edge portion of the circuit board, even when dust or the like comes near to enter therein from the outside, it can be inhibited by the peripheral wall portion. Also, an effect that the strength of the meter housing can be maintained by the wall of the peripheral wall portion can also be expected.

Also, a space sectionalized by the first reflecting wall portion and the rising reflecting wall portion may form a storage portion for storing an electronic component to be mounted on a position on the surface of the circuit board.

In this configuration, the storage portion for electronic components can be formed by the space sectionalized by the meter housing, whereby the mounting density of the electronic components to be mounted on the circuit board may be increased. In this case, since the heightwise dimension of the distance between the circuit board and the first reflecting wall portion can be increased as it goes to the peripheral edge, the tall electronic components can also be mounted.

Also, a space sectionalized by the first reflecting wall portion, the optical path guiding and reflecting wall portion and the rising peripheral wall portion may form a storage portion for storing an electronic component to be mounted on a position on the surface of the circuit board.

In this configuration, the storage portion for electronic components can be formed by the space sectionalized by the meter housing, whereby the mounting density of the electronic components to be mounted on the circuit board may be increased. In this case, since the heightwise dimension of the distance between the circuit board and the first reflecting wall portion can be increased as it goes to the peripheral edge, the tall electronic component can also be mounted. In addition, the optical path guiding and reflecting wall portion allows the relatively short electronic components to be mounted on the circuit board. Furthermore, the space between the first reflecting wall portion and the circuit board provided at a position away from the position of the center of rotation of the indicating needle allows the tall electronic components to be mounted on the circuit board.

Advantages of the Invention

Since the present invention provides a meter illumination device having a drive shaft extending forward including: a circuit board formed of a hard material; a meter body arranged on the back side of the circuit board; a light-emitting type indicating needle to be mounted on a distal end side of the drive shaft; a display panel arranged between the indicating needle and the circuit board and having at least a marking corresponding to the indicating needle; a luminous source arranged on the side of a front surface of the circuit board and configured to light up the indicating needle and the markings; and a meter housing arranged between the display panel and the circuit board and provided for setting a distance between the display panel and the circuit board, wherein the meter housing includes: a substantially cylindrical light guide tubular portion positioned on the back side of the display panel and configured to guide a radiated light beam from the luminous source toward a proximal portion of the light-emitting indicating needle, a light guide opening provided between a lower end portion of the light guide tubular portion and the circuit board, a rising reflecting peripheral wall portion positioned on the side of the front surface of the circuit board, provided so as to surround the periphery of the light guide opening at a predetermined distance from the luminous source and extend upward to a level above a light-emitting surface of the luminous source, a first reflecting wall portion provided continuously from an upper end portion of the rising reflecting peripheral wall portion to light up through an area of the marking of the display panel, and a second reflecting wall portion having a substantially inverted conical shape provided at a position on the outer periphery of the light guide tubular portion so as to reflect and guide the light from the luminous source to the first reflecting wall portion, the indicating needle can be caused to emit light and lit up by the luminous source provided around a shaft portion of the indicating needle and lighting up of the area of the markings of the display panel can also be achieved. In addition, since part of the light from the luminous source can be reflected and guided by the rising reflecting peripheral wall portion and can be reflected and guided toward the proximal portion of the indicating needle by the inner side of the light guide tubular portion, the amount of light can be compensated, whereby sufficient illumination brightness of the indicating needle can be maintained. Also, the area of the markings of the display panel can reflect and guide the light beams from the luminous sources by the first and second reflecting wall portions and, specifically, can be directly guided toward the first reflecting wall portion by the second reflecting wall portion, so that bright illumination is achieved.

BEST MODES FOR CARRYING OUT THE INVENTION

Figure 1:
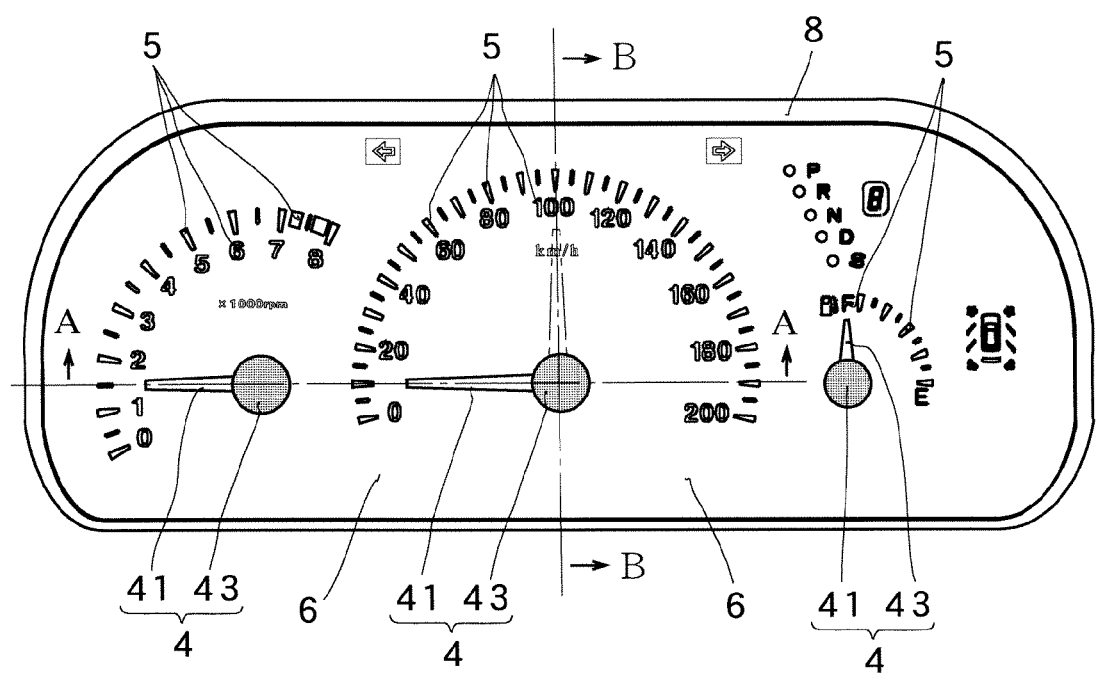
FIG. 1 is a front view showing a meter illumination device according to an embodiment of the present invention.

FIG. 1 to FIG. 5 show an embodiment of the present invention, and a case in which the embodiment of the present invention is applied to a meter illumination device in an indicating meter mounted, for example, on an automotive vehicle, with reference to these drawings.

In the drawings, the meter illumination device of an indicating needle type indicating meter according to the embodiment includes a circuit board 1, a meter body 3 conductively mounted on the circuit board 1 and having a drive shaft 2 extending toward the front, a light-emitting type indicating needle 4 mounted on the distal end side of the drive shaft 2, a display panel 6 arranged between the indicating needle 4 and the circuit board 1 and having markings 5 corresponding at least to indication of the indicating needle 4, luminous sources 7 mounted on the side of the front surface of the circuit board 1 and configured to light the indicating needle 4 and the markings 5 therethrough, a meter housing 8 arranged between the display panel 6 and the circuit board 1 so as to set the distance between the display panel 6 and the circuit board 1.

The circuit board 1 is made up of a hard circuit board provided with a wiring pattern (not shown), for example, on a glass epoxy based base material, and includes drive means (not shown) configured to drive and control the meter body 3 and various electronic components P such as resistances and condensers connected in conduction with the wiring pattern.

The meter body 3 is made up of a movable magnetic meter or a stepping motor. In this example, the drive shaft 2 is mounted on the back side of the circuit board 1 so as to penetrate through an axial hole formed on the circuit board 1, and is electrically connected to the wiring pattern (the drive means) by appropriate conduction means such as soldering or the like.

Figure 2:
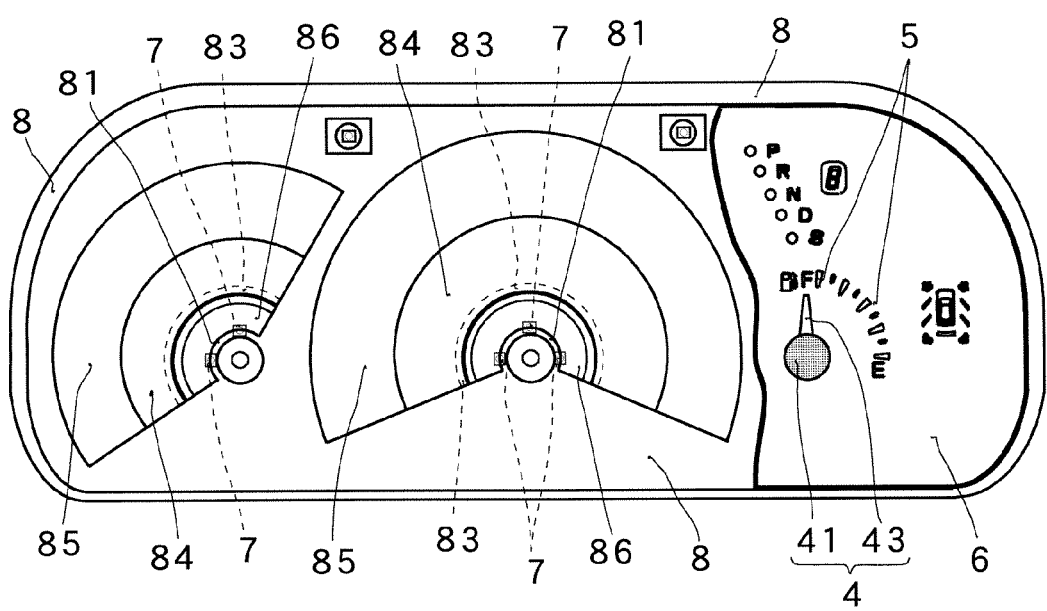
FIG. 2 is a front view of the meter illumination device showing a state in which a portion of a display panel of an engine tachometer and a portion of a display panel of a speedometer in FIG. 1 are removed.
Figure 3:
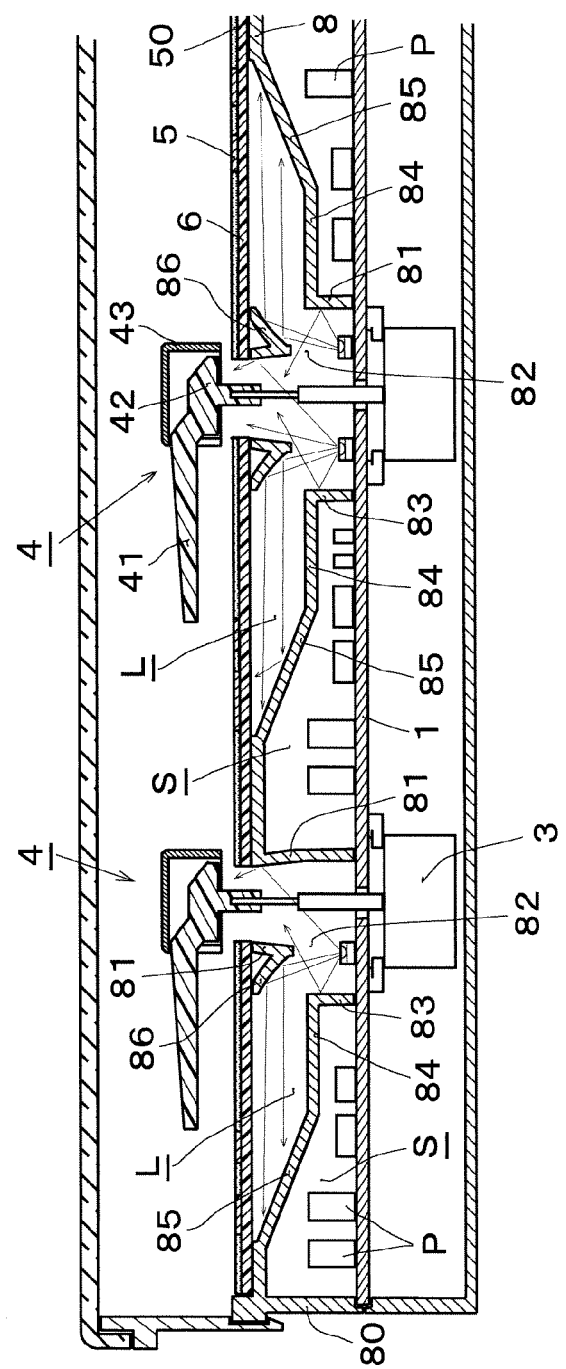
FIG. 3 is an enlarged cross-sectional view principally showing a potion taken along the line A-A in FIG. 1.
Figure 4:
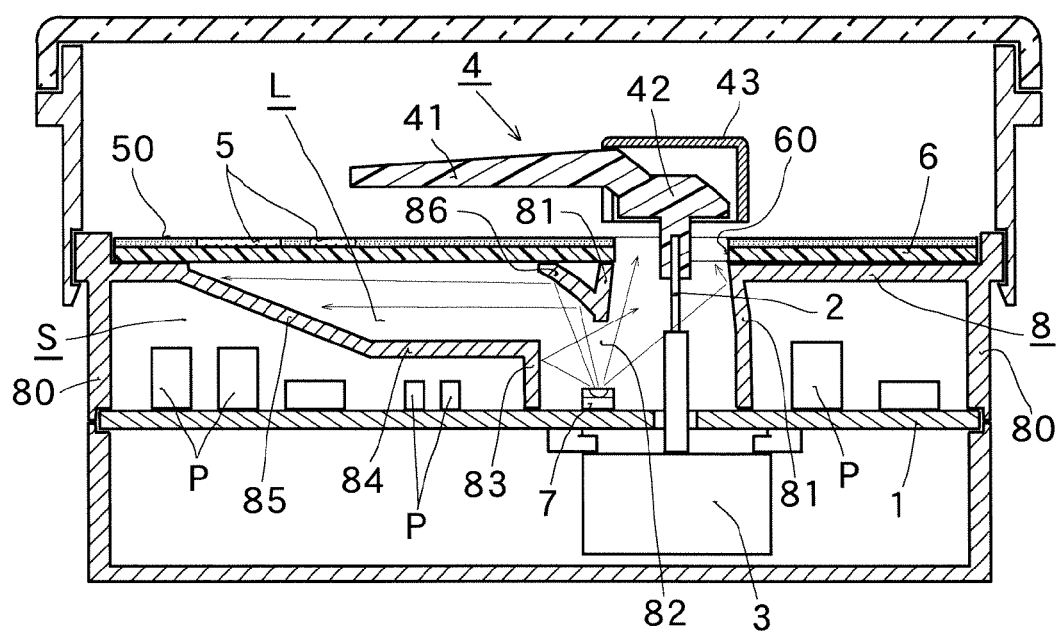
FIG. 4 is an enlarged cross-sectional view principally showing a potion taken along the line B-B in FIG. 1.
Figure 5:
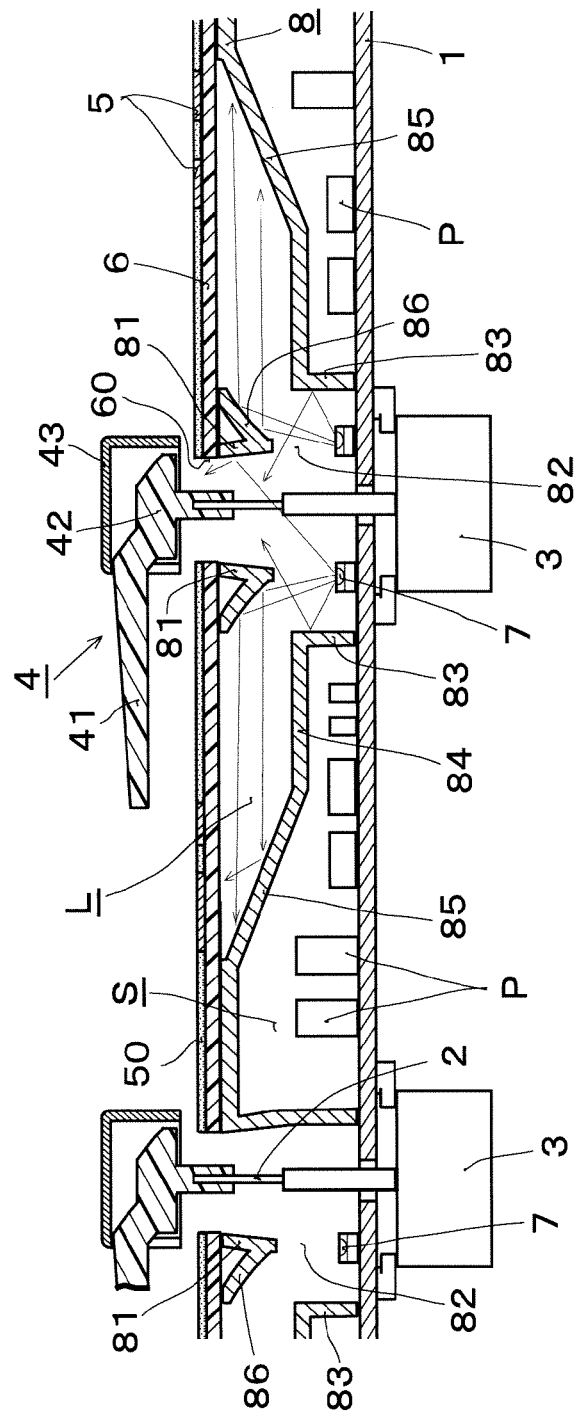
FIG. 5 is an enlarged cross-sectional view of the meter illumination device showing a principal portion of a portion of the speedometer in FIG. 3.

The indicating needles 4 are formed of light-transmitting synthetic resin, and each includes an indicating portion 41 configured to indicate the markings 5 such as calibration markings, numbers, and characters provided on the display panel 6, a proximal portion 42 formed of the same light-transmitting synthetic resin and arranged between the indicating portion 41 and the drive shaft 2, and an indicating needle cap 43 formed of light-shielding synthetic resin for covering the proximal portion 42 and a required portion of the indicating portion 41 at the center of rotation thereof, and is connected to a distal end of the drive shaft 2 via the proximal portion 42 as shown, for example, in FIG. 2.

The display panels 6 are formed of a substrate of light-transmitting synthetic resin material, and each includes in its front surface thereof light-transmitting markings 5 such as calibration markings, characters and numbers which are to be indicated by the indicating needles 4 arranged in an arcuate shape along the turning tracks of the respective indicating needles 4, and a base color portion 50 as a background of the markings 5 is formed together with the markings 5 by means of printing or the like.

As shown in FIG. 1, in the case of the indicating meter which includes a speedometer positioned at the center, for example, the markings 5 provided on the display panel 6 include calibration markings showing the speeds of a vehicle, "numbers" corresponding to the calibration markings, and characters such as "km/h". The display panel 6 is provided with a through hole 60 at a position corresponding to the drive shaft 2, and the drive shaft 2 and the indicating needle 4 are coupled through the through hole 60.

The luminous sources 7 each are formed by, for example, a chip type light-emitting diode, and are mounted on the surface of the circuit board 1 commonly as indicating needle illuminating luminous sources for causing the indicating needle 4 to emit light and to be lit up and display unit illuminating luminous sources for lighting through the markings 5 of the display panel 6.

The meter housing 8 is formed of a white based synthetic resin material by a wall portion having a substantially frame shape as a whole for supporting the indicating meters such as the speedometer, an engine tachometer, and a liquid-level indicator, and the meter housing 8 is provided with a peripheral wall portion 80 along a peripheral edge portion of the circuit board 1 so as to set a distance between the display panel 6 and the circuit board 1 and inhibit dust from entering from the outside. Also, in the meter housing 8 formed into a frame shape, a light guide tubular portion 81 positioned on the back side of the display panel 6 and having a substantially cylindrical shape and configured to guide part of an illuminating light beam from the luminous sources 7 toward the proximal portion 42 of the light-emitting type indicating needle 4 is provided, and a light guide opening 82 defined by a gap is provided between a lower end portion of the light guide tubular portion 81 and the circuit board 1.

Also, the meter housing 8 is also provided with a rising reflecting peripheral wall portion 83 extending upright from the side of the surface of the circuit board 1 toward the display panel 6 so as to surround the periphery of the light guide opening 82 while keeping a predetermined distance from the luminous sources 7. In this case, the rising reflecting peripheral portion 83 is provided so as to extend toward the display panel 6, which is at a higher level than light-emitting surfaces of the luminous sources 7.

At each of portions of the meter housing 8 where the indicating meters such as the speedometer and the engine tachometer of the embodiment are provided, the distance from the position of the center of rotation of the indicating needle 4 to the area of the markings 5 is long, and hence an optical path guiding and reflecting wall portion 84 is integrally provided continuously from an upper end portion of the rising reflecting peripheral wall portion 83 toward the outer periphery with respect to the drive shaft 2 as a center. Then, a first reflecting wall portion 85 having an inclined surface for lighting through the area of the markings 5 of the display panel 6 is provided continuously from the outer end portion of the optical path guiding and reflecting wall portion 84. Also a second reflecting wall portion 86 having a substantially inverted conical shape is provided at a position on the outer periphery of the light guide tubular portion 81 so as to reflect and guide the light from the luminous sources 7 to the first reflecting wall portion 85. Although not illustrated, at each of the portions of the meter housing 8 where the indicating meters such as the liquid-level indicator, the distance from the position of the center of rotation of the indicating needle 4 to the area of the markings 5 is short, and hence the first reflecting wall portion 85 having the inclined surface for directly lighting through the area of the markings 5 of the display panel 6 is provided continuously from the upper end portion of the rising reflecting peripheral wall portion 83.

Also, the meter housing 8 arranged between the circuit board 1 and the display panel 6 is provided with a space S sectionalized by the first reflecting wall portion 85, the optical path guiding and reflecting wall portion 84, and the rising reflecting peripheral wall portion 83, and the space S forms a storage portion for storing the electronic component P to be mounted on positions on the surface of the circuit board 1.

In the indicating meter for the speedometer configured in this manner, when the luminous source 7 emits light, part of the illuminating light is guided to the proximal portion 42 of the indicating needle 4 through the through hole 60 of the display panel 6 while being guided toward the inner wall portion of the light guide tubular portion 81 via the light guide opening 82 of the meter housing 8. Subsequently, by being guided from the proximal portion 42 to the indicating portion, the indicating portion 41 of the indicating needle 4 is lit up. Simultaneously, part of the radiated light beam from the luminous sources 7 is reflected and guided via the inner wall surface of the rising reflecting peripheral wall portion 83, is guided toward the inner wall portion of the light guide tubular portion 81 via the light guide opening 82, and is reflected and guided toward the proximal portion 42 of the indicating needle 4, so that the light amount can be compensated, and hence a sufficient amount of illumination brightness of the indicating needle 4 can be maintained.

Also, when the luminous sources 7 emit light simultaneously with lighting up of the indicating needle 4, the illuminating light is reflected by the second reflecting wall portion 86 provided right above the luminous sources 7, and the reflected light is directly guided to the first reflecting wall portion 85 and is reflected, and lights through the markings 5 of the display panel 6, so that the markings of the display panel 6 are displayed brightly with illumination. Simultaneously, the light beams from the luminous sources 7 reflected and guided via the second reflecting wall portion 86 are guided to the first reflecting wall portion 85 via the optical path guiding and reflecting wall portion 84, so that the markings 5 are lit up from the back side of the display panel 6. Therefore, the markings 5 can be lit therethrough and the amount of light can be compensated. In other words, the area of the markings 5 of the display panel 6 can reflect and guide the light beams from the luminous sources 7 by the first and second reflecting wall portions 85, 86 and the optical path guiding and reflecting wall portion 84 and, specifically, a light beam coming from a portion at a long distance can be directly guided toward the first reflecting wall portion 85 by the second reflecting wall portion 86, so that the markings 5 of the display panel can be displayed uniformly by illumination.

Also, by the provision of the peripheral wall portion 80 for setting a distance between the display panel 6 and the circuit board 1 on the meter housing 8 along the peripheral edge portion of the circuit board 1, the peripheral edge portion of the circuit board 1 can be covered with the peripheral wall portion 80 provided on the periphery of the meter housing 8 as a result. Therefore, even when dust or the like comes near to enter therein from the outside, it can be inhibited by the peripheral wall portion 80 and, in addition, an effect such that the strength of the meter housing 8 can be maintained by the peripheral wall portion 80 can also be expected.

Also, in the embodiment, the storage portion for storing the electronic components P to be mounted on the surface of the circuit board 1 can be formed by the space S sectionalized by the meter housing 8 including the first reflecting wall portion 85, the optical path guiding and reflecting wall portion 84, and the rising reflecting peripheral wall portion 83, whereby the mounting density of the electronic components P to be mounted on the circuit board 1 may be increased. In this case, since the heightwise dimension of the distance between the circuit board 1 and the first reflecting wall portion 85 can be increased as it goes to the peripheral edge, the tall electronic components P can also be mounted.

Also, an illumination chamber L for causing illuminating light beams from the luminous sources 7 to be guided to the markings 5 efficiently for lighting therethrough can be formed by a spatial space sectionalized by the display panel 6 in addition to the first reflecting wall portion 85, the second reflecting wall portion 86, and the optical path guiding and reflecting wall portion 84 and, depending on the case, reduction in the thickness of the entire indicating meter can be realized depending on the setting of the heightwise dimension of the peripheral wall portion 80 and the dimension between the optical path guiding and reflecting wall portion 84 and the display panel 6, and the high and voluminous electronic components P can be mounted on the circuit board 1 by setting the height of the space S sectionalized by the meter housing 8 as appropriate depending on the dimension between the optical path guiding and reflecting wall portion 84 and the circuit board 1.

In the embodiment described above, the display by lighting up of both of the indicating needle 4 and the markings 5 of the display panel 6 is achieved by the luminous sources 7 arranged around the drive shaft 2 of the indicating needle 4, and hence the number of the luminous sources 7 can be reduced. Also, the surfaces of the light guide tubular portion 81, the rising reflecting peripheral wall portion 83, the optical path guiding and reflecting wall portion 84, the first reflecting wall portion 85, and the second reflecting wall portion 86, which reflect and guide light from the back side of the display panel 6, may be mirror finished so as to enhance the efficiency of reflection. However, depending on the case, in order to reduce nonuniformity of illumination, a further uniform illuminating effect can be obtained by applying partially surface treatment such as surface roughing, surface texturing on the surfaces of the respective reflecting wall portions of the meter housing 8 (the surfaces of the light guide tubular portion 81, the rising reflecting peripheral wall portion 83, the optical path guiding and reflecting wall portion 84, the first reflecting wall portion 85, and the second reflecting wall portion 86).

INDUSTRIAL APPLICABILITY

Also, as an example of application, the meter illumination device such as meters for vehicles or for a motorbike has been described in the embodiment described above. However, the invention is not limited to the indicating meters for vehicles, and may be applied to the meter illumination devices for ships or a meter illumination device for special vehicles such as agricultural machineries or construction equipment.

REFERENCE NUMERALS 1 circuit board
2 drive shaft
3 meter body
4 indicating needle
5 marking
6 display panel
7 luminous source
8 meter housing
41 indicating portion 42 proximal portion
43 indicating needle cap
50 base color portion
60 through hole
80 peripheral wall portion
81 light guide tubular portion
82 light guide opening
83 rising reflecting peripheral wall portion
84 optical path guiding and reflecting wall portion
85 first reflecting wall portion
86 second reflecting wall portion
L illumination chamber
P electronic component
S space

The invention claimed is:

1. A meter illumination device comprising:
a circuit board formed of a hard material;
a meter body arranged on the back side of the circuit board and having a drive shaft extending forward;
a light-emitting type indicating needle to be mounted on a distal end side of the drive shaft;
a display panel arranged between the indicating needle and the circuit board and having at least a marking corresponding to the indicating needle;
a luminous source arranged on the side of a front surface of the circuit board and configured to light up the indicating needle and the markings; and
a meter housing arranged between the display panel and the circuit board and provided for setting a distance between the display panel and the circuit board,
wherein the meter housing includes: a substantially cylindrical light guide tubular portion positioned on the back side of the display panel and configured to guide a radiated light beam from the luminous source toward a proximal portion of the light-emitting indicating needle,
a light guide opening provided between a lower end portion of the light guide tubular portion and the circuit board,
a rising reflecting peripheral wall portion positioned on the side of the front surface of the circuit board, provided so as to surround the periphery of the light guide opening at a predetermined distance from the luminous source and extend upward to a level above a light-emitting surface of the luminous source,
a first reflecting wall portion provided continuously from an upper end portion of the rising reflecting peripheral wall portion to light up through an area of the marking of the display panel,
a second reflecting wall portion having a substantially inverted conical shape provided at a position on the outer periphery of the light guide tubular portion so as to reflect and guide the light from the luminous source to the first reflecting wall portion, and
the light-emitting surface of the luminous source faces in a direction toward the display panel.

2. The meter illumination device according to claim 1, wherein the meter housing is provided with an optical path guiding and reflecting wall portion that connects the rising reflecting wall portion and the first reflecting wall portion.

3. The meter illumination device according to claim 1, wherein the meter housing is provided with a peripheral wall portion so as to set the distance between the display panel and the circuit board along a peripheral edge portion of the circuit board.

4. The meter illumination device according to claim 1, wherein a space sectionalized by the rising reflecting wall portion and the first reflecting wall portion forms a storage portion for storing an electronic component to be mounted on a position on the surface of the circuit board.

5. The meter illumination device according to claim 2, wherein a space sectionalized by the first reflecting wall portion, the optical path guiding and reflecting wall portion and the rising peripheral wall portion forms a storage portion for storing an electronic component to be mounted on a position on the surface of the circuit board.

6. The meter illumination device according to claim 2, wherein the meter housing is provided with a peripheral wall portion so as to set the distance between the display panel and the circuit board along a peripheral edge portion of the circuit board.

* * * * *